United States Patent [19]

Prairie, Jr.

[11] Patent Number: 5,317,108
[45] Date of Patent: May 31, 1994

[54] WEATHER-RESISTANT ELECTRICAL OUTLET COVER ASSEMBLY

[75] Inventor: Marshall J. Prairie, Jr., Pawtucket, R.I.

[73] Assignee: L.E. Mason Company, Boston, Mass.

[21] Appl. No.: 991,368

[22] Filed: Dec. 15, 1992

[51] Int. Cl.⁵ .............................................. H02G 3/14
[52] U.S. Cl. ........................................................ 174/67
[58] Field of Search .................. 174/67; 220/242; 439/135, 136, 147

[56] References Cited

U.S. PATENT DOCUMENTS

| | | | |
|---|---|---|---|
| 2,510,745 | 6/1950 | Kilgore | 174/67 |
| 2,997,520 | 8/1961 | Kinsman | 174/67 |
| 3,127,048 | 3/1964 | Winter | 220/337 |
| 4,109,095 | 8/1978 | Kling et al. | 174/67 |
| 4,134,516 | 1/1979 | Sullo | 220/242 |
| 4,265,365 | 5/1981 | Boteler | 220/3.3 |
| 4,342,493 | 8/1982 | Grenell | 439/142 |
| 4,381,063 | 4/1983 | Leong | 220/242 |
| 4,434,407 | 1/1984 | Barbic | 174/67 |
| 4,603,932 | 8/1986 | Heverly | 439/147 |
| 4,605,817 | 8/1986 | Lopez | 174/67 |
| 4,620,061 | 10/1986 | Appleton | 174/51 |
| 4,623,753 | 11/1986 | Feldman et al. | 174/50 |
| 4,654,470 | 3/1987 | Feldman et al. | 174/50 |
| 4,803,307 | 2/1989 | Shotey | 174/67 |
| 4,874,906 | 10/1989 | Shotey | 174/67 |
| 4,979,634 | 12/1990 | Begley | 220/242 |
| 4,988,832 | 1/1991 | Shotey | 174/67 |
| 5,171,939 | 12/1992 | Shotey | 174/67 |
| 5,228,584 | 7/1993 | Williams | 220/242 X |

FOREIGN PATENT DOCUMENTS 2824477 3/1979 Fed. Rep. of Germany.

Primary Examiner—Leo P. Picard
Assistant Examiner—David A. Tone
Attorney, Agent, or Firm—Cesari and McKenna

[57] ABSTRACT

A gasketless weather-resistant electrical outlet cover assembly includes a cover plate with a top wall and an aperture for exposing an electrical device and a door having a top wall which is hingedly connected to the cover plate top wall. The hinged connection includes at least one hook projecting up from the cover plate top wall, each hook having a slot extending into the space under the hook. The hinge connection also includes at least one laterally extending hinge pin on the door for pivotal engagement in the space under a hook on the cover plate through the slot therein so that the door can swing between a closed position wherein the cover covers the aperture in the cover plate to an open position wherein the door is swung away from the cover plate to expose that aperture. A cam is provided on the top wall of the door which is shaped to shift the door relative to the plate when the door is moved beyond a selected amount toward its closed position so that each hinge pin is raised above the corresponding hook slot. Preferably, each hinge pin is flattened so that it cannot be slid through the hook slot unless the door is in its fully open position. Interfitting latch members may be provided at the bottoms of the cover plate and door, respectively, which members interfit when the door is in its closed position to latch the door in that position.

16 Claims, 2 Drawing Sheets

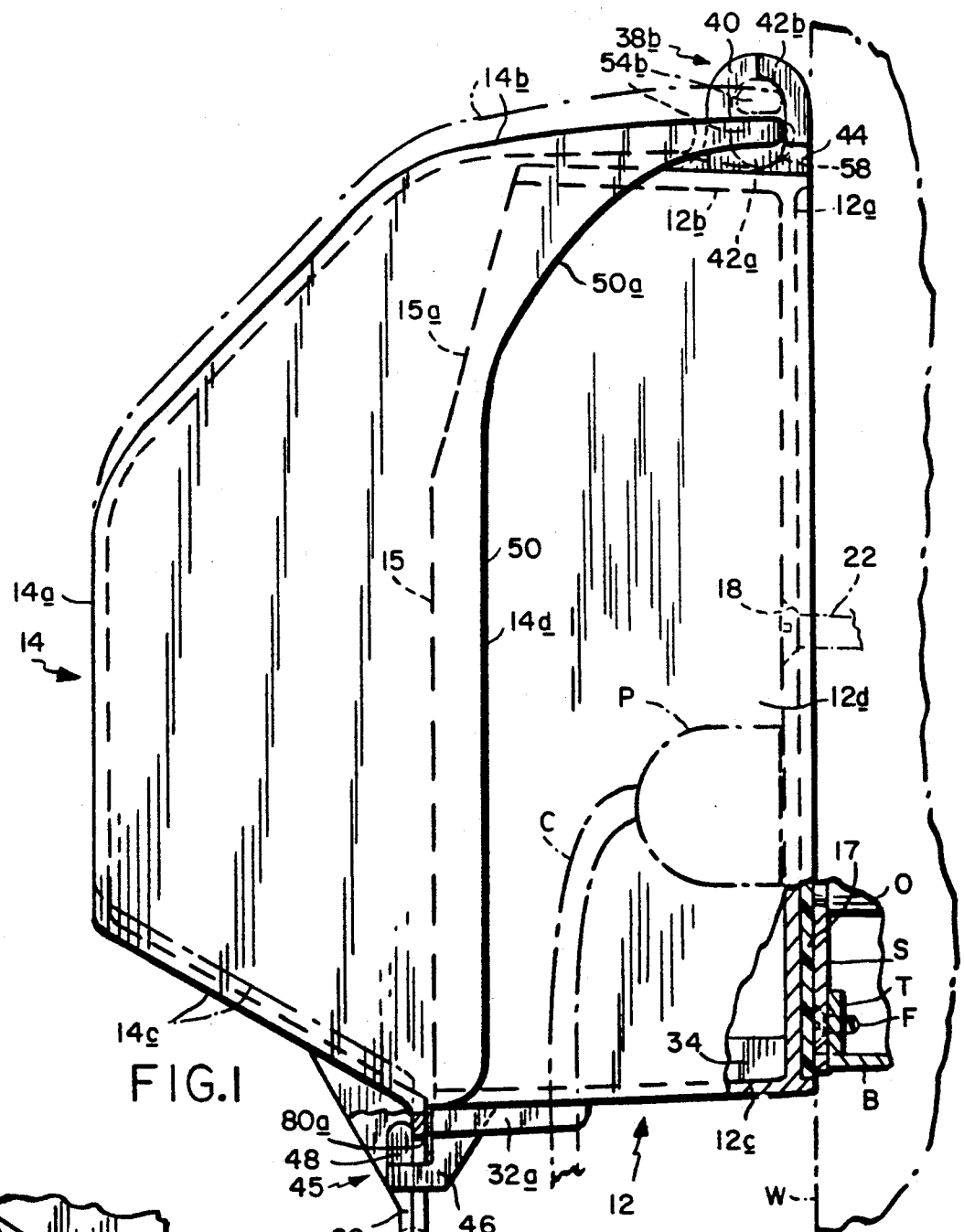
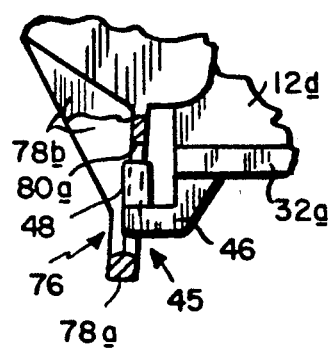
FIG. 4
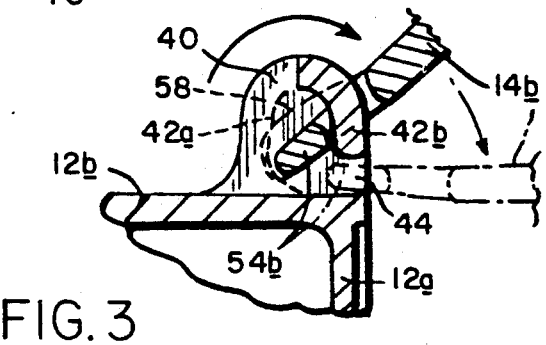
FIG. 3

WEATHER-RESISTANT ELECTRICAL OUTLET COVER ASSEMBLY

FIELD OF THE INVENTION

This invention relates to an outlet cover. It relates more particularly to an improved weather-resistant cover assembly for electrical outlets, switches and the like.

BACKGROUND OF THE INVENTION

Weather-proof and weather-resistant covers are used in conjunction with electrical boxes or other housings to protectively enclose various electrical devices. Such covers are particularly useful to afford ready access to exterior electrical outlets while protecting them from moisture and weather.

The typical electrical outlet box is generally rectangular and is closed on five sides and is recessed into or mounted exterially of a structure so that its open side is accessible. The box is typically sized to receive a standard electrical device such as a duplex outlet or switch and the device is secured to the box with its front face substantially flush with the open face of the box. An opening in a wall of the box permits passage of electrical leads for connecting the device to an electrical source or to another such fixture.

The cover assembly of the general type with which we are concerned here includes a cover plate which is co-extensive with the open side of the outlet box. That plate is provided with one or more apertures shaped and located so as to expose the working parts of the device contained in the box while isolating the electrically live parts of the device. The cover is usually secured in place by one or more threaded fasteners extending through an opening in the cover and turned down into a threaded hole in the box or in the device contained therein.

The usual weather-proof cover assembly also includes one or more doors or lids hinged to the cover plate to protect the electrical fixture mounted in the associated box from the weather when the fixture is not in use. In some cases, a single door protects an entire fixture, but sometimes, each aperture in the cover plate has its own door so that, for example, one receptacle of a duplex outlet can be in use while the other outlet receptacle is protected from the weather by an overlying door. See, for example, U.S. Pat. Nos. 4,134,516 and 4,342,493.

The prior weather-proof cover assemblies of this general type are usually relatively complex structures composed of several parts which are fairly difficult to make and to assemble. Some require separate hinge parts to connect each aperture door to the cover plate. Some require separate springs to bias each door to its closed position against the cover plate. During assembly, all of these various parts must be arranged and secured at their proper locations. Thus, all of the drilling, forming and connecting steps required to fabricate the prior box covers makes them relatively expensive hardware items.

Also, most prior outdoor cover assemblies are disadvantaged in that they provide protection against the weather only when the associated electrical fixtures are not in use, i.e., when the cover plate doors are closed. As soon as the doors are swung open to provide access to the associated electrical device, those fixtures are exposed to the elements and become vulnerable to damage from the elements.

However, there do exist some cover assemblies which do protect the associated electrical devices, usually electrical outlets, from the weather when the fixtures are in use. These known assemblies have hinged lids or doors which are deep enough to provide clearance for a plug or plugs plugged into the electrical outlet being protected by the cover assembly. Those assemblies also include openings for accommodating the electrical cords terminated by the plug or plugs, which openings are located at the bottoms of the assemblies so that the openings do not admit rainwater. Examples of such weather-resistant plug-enclosing outlet cover assemblies are disclosed in U.S. Pat. Nos. 2,510,745; 4,424,407; 4,803,307 and 4,874,906.

The above plug-enclosing outlet cover assemblies are disadvantaged somewhat in that the hinged doors or lids are not connected positively to the cover plates of those assemblies. Consequently, it is relatively easy for the doors or lids to become separated from the cover plates, with the result that it is relatively easy to avoid using the doors or lids so that the associated electrical devices are left unprotected. Also, being easily separated from the plates, the doors or lids can become lost.

Still further, the prior plug-enclosing cover assemblies all require special seals or gaskets between the doors and the cover plates to prevent infiltration of water when the doors are closed. The seals add to the overall cost of the assemblies and also they can deteriorate over time and loose their sealing ability, particularly if the associated electrical outlets have to accessed repeatedly.

Finally, prior plug-receiving outlet covers are composed of many different parts which are just as expensive to make as the parts of the prior covers discussed at the outset which do not protect the associated fixture when the fixture is being used.

SUMMARY OF THE INVENTION

Accordingly, the present invention aims to provide an improved weather-resistant outlet cover assembly for electrical devices and the like.

Another object in the invention is to provide a cover assembly of this general type composed of only two parts namely a cover plate and a door, both of which are relatively easy and inexpensive to make in quantity.

A further object of the invention is to provide such a cover which can be assembled quickly and easily without any special tools, jigs or fixtures.

Still another object of the invention is to provide a weather-resistant outlet cover assembly for protecting the associated outlet from moisture and the weather both when the outlet is being used and when it is not being used.

A further object of the invention is to provide such a cover assembly whose door or lid cannot be separated from the cover plate when the assembly is in use.

Still another object of the invention is to provide a cover assembly of this type which does not require a separate gasket or seal between the door and the cover plate.

A further object is to provide a cover assembly whose door and cover plate are swingably connected by a special integral releasable hinge structure.

Another object is to provide an assembly of this type whose door can be latched and locked in the closed position against the cover plate.

Other objects will, in part, be obvious, and will, in part, appear hereinafter.

The invention accordingly comprises the features of construction, combination of elements and arrangement of parts which will be exemplified in the following detailed description, and the scope of the invention will be indicated in the claims.

Briefly, my cover assembly consists of just two separate parts, namely, a relatively deep rectilinear box-like cover plate with an open front and a relatively deep rectilinear door or lid releasably hinged to the top of the cover plate so that the door can be swung between a closed position wherein the door completely closes the front of the cover plate and an open position wherein the door is swung up away from the front of the cover plate so that access may be had to the interior of the cover plate and to the associated electrical device behind the cover plate.

The cover plate component of the assembly has top and bottom walls, a pair of side walls and a rear wall, that last wall being provided with one or more openings sized and shaped to receive and/or to expose the working part(s) of an electrical device, a duplex outlet for example, mounted in a standard outlet box recessed into the wall of a building structure such as a house. The cover plate is arranged to engage over the front of the outlet box and fixture therein and to be secured thereto by one or more threaded fasteners each extending through the rear wall of the cover plate and turned down into a standard threaded passage provided in the outlet box or the fixture therein.

It is a feature of this invention that my cover assembly requires no seal or gasket between the cover plate and door. Yet, it protectively encloses the receptacle(s) of the associated electrical outlet whether or not the outlet is in use. For this, the assembly incorporates special integral releasable hinge connections between the door and the cover plate. Also, the cover plate and door components of the assembly are designed so that when the door is in its closed position, there is a substantial overlap of the top, bottom and side walls of the door with the corresponding walls of the cover plate. Moreover, the combined depth of the cover plate and door is such that the plug or plugs plugged into the electrical outlet are completely enclosed by the cover plate and door in a weatherproof manner. One or more openings are provided at the bottom of the cover assembly to allow the electrical cords from the plug or plugs to extend out of the assembly.

The special hinge construction that releasably swingably connects the door to the cover plate to achieve a substantially weather-proof overlap between the door and the cover plate when the door is closed comprises a pair of laterally spaced apart, mirror image, upstanding, integral hinge members on the top wall of the cover plate adjacent to the rear corners thereof. Each member comprises a raised ear with inboard and outboard hooks extending laterally from opposite sides of the ear. Each inboard hook faces rearwardly and each outboard hook faces forwardly and has a relatively short slot or mouth between the rear end of that hook and the cover plate top wall.

The cover assembly door is also formed with integral hinge structures on the top wall of the door. Each such structure consists of a pair of specially shaped, laterally spaced apart, collinear inboard and outboard hinge pins which are designed to releasably engage the inboard and outboard hooks of the corresponding hinge members on the cover plate. The pins are generally oval in cross section with their minor dimension being slightly smaller than the aforesaid mouths of the laterally outboard hooks on the cover plate, the major dimension of the pins being larger than those mouths. Also, extending along the rear edge of the door top wall between the hinge structures is a cam which projects beyond the axis of the pins and is arranged to engage the top wall of the cover plate between the hinge members thereon when the door is swingably connected to the cover plate.

The door is connected to the cover plate by inverting the door and positioning its top wall, i.e., the one bearing the hinge pins, in more or less the same plane as the top wall of the cover plate and with the pins facing the hooks on the cover plate. With this orientation of the door, the laterally outboard pins thereon can be slid through the slots of the laterally outboard hooks on the cover plate until the laterally inboard pins engage against the laterally inboard hooks. When the door is swung forwardly, i.e., toward its closed position, the outboard hinge pins are rotated to present their major cross sectional dimension to the outboard hook slots so that they cannot escape through those slots.

Also, the aforesaid cam on the door top wall rides on the top wall of the cover plate and jacks up the door relative to the cover plate so that the hinge pins are positively pivotally captured by their respective hooks so that the door cannot be separated from the cover plate.

As the door is swung downwardly toward its closed position on the cover plate, the hinge pins pivot in their respective cover plate hooks and the cam surface slides along the top wall of the cover plate, the totality of those elements forming a pivotal connection which guides the door smoothly and reliably to a closed position wherein the top, bottom and side walls of the door overlap the corresponding walls of the cover plate leaving minimal clearance between the door and the cover plate. Resultantly, when the door is closed, the door and cover plate, in combination, provide a secure weather-tight enclosure for the electrical outlet behind the cover assembly and any plug plugged into that outlet.

In particular, the substantial overlap between the door and cover plate walls prevents even wind-driven rain from contacting the outlet receptacles or any electrical plugs plugged into those receptacles. Any moisture that does find its way into the cover assembly is free to drain downward and out of the assembly through the bottom cord openings therein.

Preferably also, means are provided on the cover assembly for releasably latching the door in its closed position on the cover plate. More particularly, an upstanding tab or detent is formed adjacent to the bottom wall of the cover plate at the forward edge thereof. Also, a depending lip is present on the bottom wall of the door adjacent to the rear edge thereof. The above described hinged connection between the door and cover plate allows limited relative vertical movement between those two members so that when the door is swung to its closed position, it can be raised to engage the lip on the door behind the tab on the cover plate so that the lip and tab interfit thereby latching the door in its fully closed position.

Most desirably, the lip on the door constitutes part of a ring which extends down from the bottom wall of the door. When the door is closed and latched as aforesaid, the hasp of a padlock may be inserted through that ring thereby preventing the door from being lifted vertically and unlatched from the cover plate.

My cover assembly has only two parts each of which may be made in quantity relatively inexpensively by conventional molding or casting methods. Furthermore, the two components of the assembly can be assembled by the ultimate user quite quickly and without requiring any special tools simply by hooking the door component of the assembly to the cover plate component thereof, before the assembly is installed to an electrical box. Once the cover assembly is mounted to the box, the door cannot be separated from the cover plate because the door cannot be swung up and back far enough to allow the hinge pins on the door to escape from the hooks on the cover plate.

BRIEF DESCRIPTION OF THE DRAWINGS

For a fuller understanding of the nature and objects of the invention reference should be had to the following detailed description, taken in connection with the accompanying drawings in which:

FIG. 1 is a side view, with parts broken away, showing a weather-resistant outlet cover assembly incorporating my invention;

FIG. 3 is a fragmentary sectional view illustrating the door hinge construction of the FIG. 1 assembly, and FIG. 4 is a similar view showing the operation of the door latch on the FIG. 1 assembly.

DETAILED DESCRIPTION OF ILLUSTRATIVE EMBODIMENT

Figure 2:
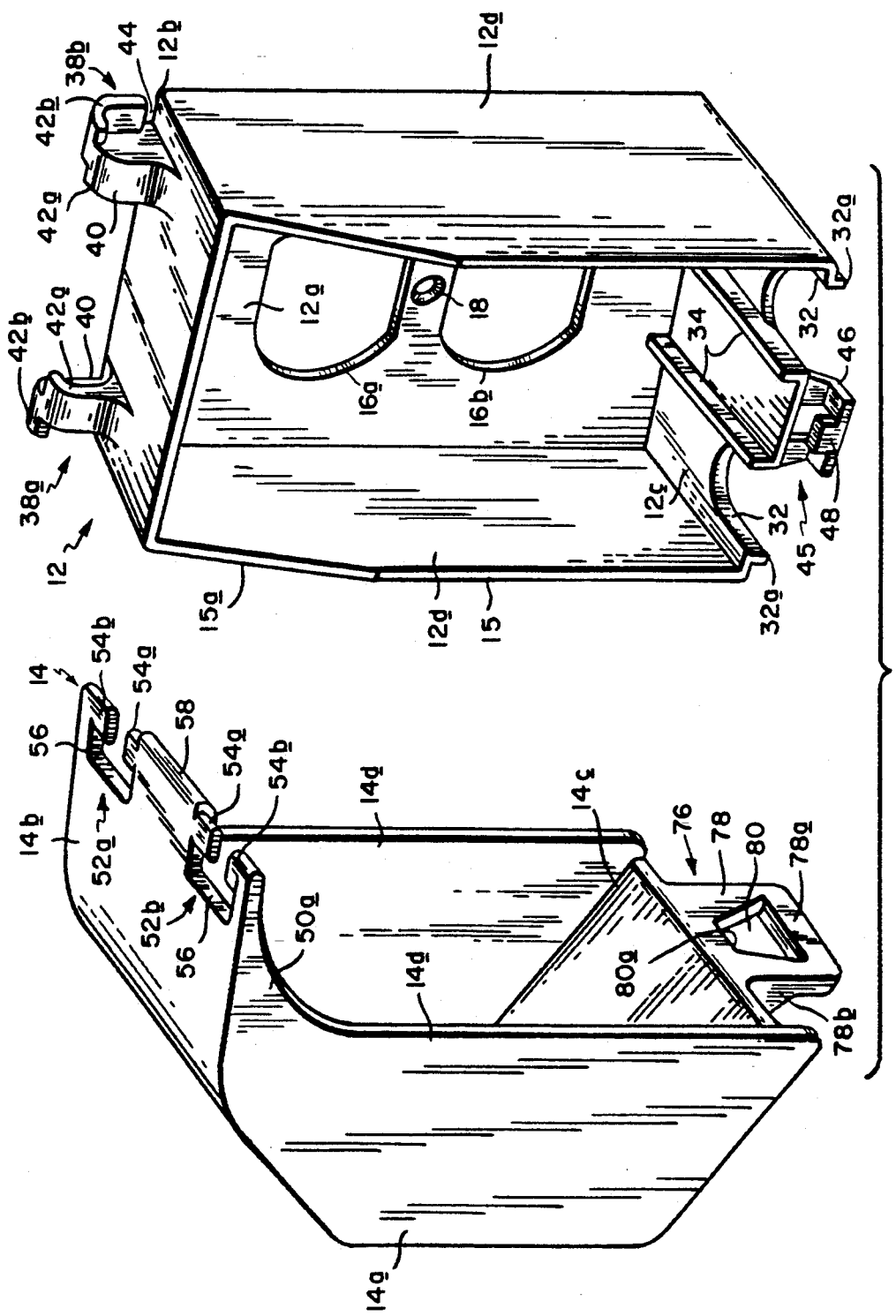
FIG. 2 is an exploded isometric view showing the two components of the FIG. 1 assembly.

Referring to FIGS. 1 and 2 of the drawings, my improved cover assembly comprises a box-like cover plate shown generally at 12 having an open front which may be closed by a relatively deep lid or door indicated generally at 14 which is releasably hinged to cover plate 12.

Cover plate 12 is a unitary structure which may be cast or molded of a suitable rugged impact resistant material such as metal or a weather-resistant plastic material. The cover plate has a generally rectangular rear wall 12a, a top wall 12b, a bottom wall 12c and a pair of mirror image side walls 12d. The front of the cover plate 12 is open so that the plate has a forward or leading edge 15 which extends around the plate. Furthermore, the side walls 12d of the plate are tapered about two thirds of the way up from the bottom wall of the plate so that the upper third of edge 15 angles rearwardly as shown at 15a.

The rear wall 12a of cover plate 12 is provided with upper and lower openings 16a and 16b which are arranged and adapted to receive the working portions or receptacles of a standard duplex electrical outlet O as shown in FIG. 1. As seen there, the outlet O is contained in a standard electrical outlet box B recessed into the exterior wall W of a structure such as a house. As is customary with outlet of this type, the outlet O has thin metal straps S extending from its upper and lower ends and the strap ends are secured by threaded fasteners F to small tabs T extending inward from the upper and lower ends of box B.

As best seen in FIG. 1, the rear wall 12a of cover plate 12 is recessed slightly to receive a more or less standard resilient gasket 17 to provide a water-tight seal between the forward edges of outlet box B and the rear wall 12a of the cover plate. Of course, appropriate openings (not shown) are provided in gasket 17 which register with the receptacle openings 16a and 16b in the rear wall of the cover plate.

Cover plate 12 may be releasably secured in front of the outlet O by appropriate fastening means which fasten to the box B or to the outlet O therein. In the illustrated embodiment of the invention, a counter-sunk opening 18 is provided in the cover plate rear wall 12a for receiving a threaded fastener 22 which is threaded into the front of the electrical outlet O at a location between the upper and lower receptacles thereof.

As best seen in FIG. 1, the box-like cover plate 12 of my assembly is deep enough so that when a plug P terminating an electrical cord C is plugged into the outlet O, the plug and cord are completely surrounded by the walls of the cover plate. The illustrated cover plate is about 1½ inches deep.

Preferably, one or more openings 32 are provided in the bottom wall 12c of the cover plate so that the cord C can be led out of the cover assembly. In the illustrated cover assembly, there are two openings in the form of slots which extend rearwardly from the cover plate front edge 15 to provide clearance for two cords C in the event that a plug P is plugged into each of the upper and lower receptacles of the outlet O. Ideally, depending flanges 32a are provided around the openings to minimize chafing of the cord C.

Desirably also, a pair of spaced-apart, parallel, rearwardly extending raised ribs 34 are formed on cover bottom wall 12c to separate the cords C and help guide them down through the openings 32 in the cover plate bottom wall.

Referring now to FIGS. 1 to 3, cover plate 12 also includes a pair of integral, collinear, mirror-image hinge members 38a and 38b projecting up from the cover plate top wall 12b at the rear corners thereof. Each member 38a, 38b comprises a raised ear 40. Projecting laterally from ear 40 is an inboard, rearwardly facing hook 42a and an outboard, forwardly facing hook 42b. Each hook 42a curves downwardly and forwardly from the top of the ear all the way to the plate top wall 42b. Each hook 42b, on the other hand, curves downwardly-rearwardly from the top of the ear almost to the wall 12b so that a short rear mouth or slot 44 exists between the lower end of the hook 42b and wall 12b. These hinge members 38a and 38b are specially shaped thusly so that they can be molded, die cast or otherwise formed integrally with the cover plate 12 in a single operation.

As best seen in FIG. 1, a latch member shown generally at 45 is present at the front edge of the cover plate bottom wall 12c. The latch member comprises a step member 46 which steps down from wall 12c and a tab or detent 48 which projects up from the step member.

Referring now to FIGS. 1 and 2, the cover assembly's door or lid 14 is a box-like structure having a front wall 14a, a top wall 14b, a bottom wall 14c and a pair of side walls 14d. The rear of the door is open, that opening being defined by the door rear edge 50 which angles rearwardly at 50a about three quarters of the way up the door. The door is somewhat longer than the cover plate to allow some vertical movement of the door relative to the cover plate for reasons to be described. The actual depth of the door 14 may vary depending upon the sizes of the plug P and cord C that the cover assembly is intended to accommodate. The illustrated door 14 is about 1¾ inches deep so that it is well able to cover moderately sized plugs P and their cords C. The actual shape of door 14 may also vary depending upon those same factors.

Formed adjacent to the rear corners of the door top wall 14b is a pair of integral, collinear mirror-image hinge structures 52a and 52b. Each structure 52a, 52b comprises a pair of laterally spaced apart, collinear inboard and outboard hinge pins 54a and 54b, respectively, formed at the mouth of a notch 56 extending into the rear edge of the door top wall 14b. Pins 54a and 54b are flattened so that they have cross sections which are generally oval in shape with the minor axes of the pins being generally perpendicular to the plane of top wall 14b. The opposing ends of each pair of pins are spaced apart a distance slightly greater than the thickness of the hinge portion ears 40 on the cover plate 12.

The rear edge of the door top wall 14b between the hinge structures 52a and 52b is thickened and specially shaped to form a cam 58 which is arranged to ride on the surface of cover plate top wall 12b to control the opening and closing motion of door 14 when the door is hingedly connected to plate 12 as will be described shortly.

Still referring to FIGS. 1 and 2, extending down from the bottom wall 14c of door 14 is a latch member shown generally at 76 which is arranged to cooperate with the latch member 45 on the cover plate 12 when the door 14 is closed. Latch member 76 consists of a relatively large depending rectangular tab 78 which is integral to the door bottom wall 14c. The tab has a lower edge 78a which is relatively straight and parallel to the rear edge of door wall 14c. The tab may be provided with integral side struts 78b which extend up to the underside of the door bottom wall 14c to rigidify the tab. Preferably also, a trapezoidal opening 80 is provided in the tab and that opening has a relatively straight horizontal upper edge 80a for reasons that will become apparent.

Referring now to FIG. 3, to assemble door 14 to cover plate 12, the door is positioned as shown in phantom in FIG. 3 with the door top wall 14b angled rearwardly and more or less parallel to the cover plate top wall 12b and with the hinge structures 52a and 52b of the door located directly opposite the hinge members 38a and 38b on plate 12. Then, the door is moved forwardly so that the pins 54a and 54b of each hinge structure bracket the ear 40 of the corresponding hinge member on the cover plate. As noted previously, the minor dimension of pins 54a, 54b is smaller than the heights of the hook slots 44 so that the outboard pins 54b of the hinge structures 52a, 52b can slide through those slots under the outboard hooks 42b until the inboard pins 54a engage the fronts of the inboard hooks 42a.

Then, the door 14 is swung upwardly and forwardly, i.e., counterclockwise in FIG. 3, toward the position shown in solid lines in that figure. When this occurs, the cam 58 on the top wall of door 14 engages the top wall of the cover plate 12 and jacks the door 14 upwards so that the hinge pins 54b are now located well above the slots 44 of the respective outboard hooks 42b.

The major cross sectional axis or dimension of each pin 54a, 54b is appreciably larger than the heights of the hook slots 44 so that now the pins 54a, 54b are rotatably captured by the hooks 42a, 42b. If the door 14 is swung forwardly further toward its closed position, the cam 58 will ride over the cover plate top wall 12b to urge the pins 54a, 54b against their respective hooks 42a, 42b so that the pins and hooks in conjunction with the cam form pivots for the door, enabling the door to be swung to its closed position shown in FIG. 1.

As the door approaches that position, the oval or flattened hinge pins allow the door to be raised by means of latch member 76 to the position shown in FIG. 4 and in phantom in FIG. 1 so that the upper edge 80a of opening 80 can be engaged over the tab or detent 48 at the bottom of the cover plate 12. When that is accomplished and the door is allowed to drop to its solid line position shown in FIG. 1, the opening edge 80a engages behind detent 48 thereby latching the door in its closed position.

Once door 14 is hingedly connected to cover plate 12, the cover plate may be secured to the outlet box B in a conventional manner. After the cover plate is installed thusly, it will be apparent that the door 14 can no longer be separated from the cover plate. This is because the cover plate cannot be swung upwardly and rearwardly to the position shown in phantom in FIG. 3 that allows the hinge pins 54b to escape from their respective hooks 42b through the hook slots 44. Therefore, once the cover assembly is installed, there is little likelihood of the door 14 becoming separated from cover plate 12 and being lost. Moreover, since the door does not have a stable open position and will fall under the gravity when released, there is no possibility of the door being left open inadvertently and exposing the outlet O and any plug P to the elements.

When door 14 is closed and latched as in FIG. 1, it may be locked in that position by passing the hasp of a standard padlock through opening 80 below step 46. This will prevent the door from being raised up to release the door latch member 76 from the latch detent 48 on the cover plate as described above.

Also, it should be appreciated from the foregoing that doors or lids having various depths and shapes may be used with the same hinge plate 12 simply by making the hinge structures on the doors of uniform size to mate with the hinge members on the cover plate to accommodate different size plugs P. Also, in some applications it may be desirable to use hinge pins having a round cross section and to rely on the door cam 58 to raise the door relative to the cover plate sufficiently to move the hinged pins above the slots 54 so that the pins cannot escape from the slots when the door is not in its extreme open position shown in phantom in FIG. 3.

It will thus be seen at the objects set forth above, among these made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

I claim:

1. A weather-resistant electrical outlet cover assembly comprising a cover plate having a top wall and at least one aperture for exposing an electrical device behind the cover plate;

a door having a top wall;

at least one first hinge means projecting up from the cover plate top wall, said first hinge means including laterally extending hook means defining a space between the hook means and the top wall of the cover plate and means defining a slot extending into said space, and at least one second hinge means on the top wall of said door, said second hinge means including a laterally extending hinge pin for pivotal engagement in said space through said slot so that the door can swing between a closed position wherein the door overlies said aperture and an open position wherein the door is swung away from the cover plate to expose said aperture, and cam means on the top wall of said door and engaging the top wall of the cover plate, said cam means being shaped to shift said door relative to said cover plate when the door is moved by more than a selected amount from said open toward said closed position so that the hinge pin cannot escape from the hook means through said slot.

2. The assembly defined in claim 1 wherein said slot faces the rear of said cover plate.

3. The assembly defined in claim 1 wherein said hinge pin has a generally oval cross section with a minor cross sectional dimension which is slightly smaller than the height of said slot and a major cross sectional dimension which is larger than the height of said slot.

4. The assembly defined in claim 3 wherein the minor cross sectional dimension of said pin lies in a direction which is generally perpendicular to the nominal plane of said door top wall.

5. The assembly defined in claim 1
wherein the cover plate and door each have a bottom wall, and further including
first latch means extending down from said cover plate bottom wall, and
second latch means extending down from said door bottom wall, said first and second latch means being arranged and adapted to interfit when said door is in its closed position.

6. The assembly defined in claim 5 wherein
said first latch means include an upstanding tab positioned below said cover plate bottom wall, and
said second latch means include a ring extending below said door, the opening through said ring being arranged to receive said tab when the door is in its closed position.

7. The assembly defined in claim 5 and further including at least one cord-receiving aperture in the bottom wall of at least one of said cover plate and door.

8. The assembly defined in claim 1 wherein said hook means of each first hinge means include
an ear projecting up from the cover plate top wall and having opposite sides;
a rearwardly facing hook integral to one side of said ear;
a forwardly facing hook integral to the other side of said ear, and
said slot extends through the rear wall of said forwardly facing hook parallel to said cover plate top wall.

9. The assembly defined in claim 8 wherein each second hinge means include
a pair of laterally extending collinear pins one of which is said hinge pin and whose opposing ends are spaced apart a distance slightly greater than the thickness of said ear so that said pins can bracket said ear and engage under said hooks.

10. The assembly defined in claim 9 wherein the assembly includes
a pair of first hinge means laterally spaced apart on said cover plate top wall, and
a pair of second hinge means similarly laterally spaced apart on said door top wall.

11. The assembly defined in claim 10 wherein said cam means extend laterally along said door top wall between said pair of second hinge means.

12. A weather-resistant electrical outlet cover assembly comprising
a box-like cover plate having a top wall, a rear wall containing at least one aperture for exposing an electrical device behind the plate and an open front;
a box-like door having a top wall and an open rear, said cover plate and door being dimensioned such that the door can overlap so as to close the open front of the cover plate;
a pair of laterally spaced apart hinge members projecting up from the top wall of the cover plate, each hinge member including
an ear having opposite sides,
a rearwardly facing hook integral to one side of said ear and having a front wall,
a forwardly facing hook integral to the other side of said ear and having a rear wall, and
means defining a slot in said hook rear wall;
a pair of laterally spaced apart hinge structures in the top wall of said door, each hinge structure including
a pair of laterally extending collinear pins whose opposing ends are spaced apart a distance slightly greater than the thickness of a said ear, the pairs of pins of said hinge structure being adapted to bracket said ears so that the pins opposite the forwardly facing hooks can slide through said slots and engage under the forwardly facing hooks allowing the pins opposite the rearwardly facing hooks to engage against said front walls thereof forming a pair of pivotal connections between the door and the cover plate which permit the door to swing between a closed position wherein the door covers the open front of the cover plate and an open position wherein the door is swung away from the cover plate to expose said aperture.

13. The assembly defined in claim 12 wherein said pins have generally oval cross sections with a minor cross sectional dimension which is slightly smaller than the height of said slot and a major cross sectional dimension which is larger than the height of said slot.

14. The assembly defined in claim 13 wherein the pins are oriented about a common axis such that the pins opposite the forwardly facing hook can slide through said slots only when the door is opened beyond its said open position to a door release position.

15. The assembly defined in claim 12 and further including cover means on the top wall of the door and engaging the top wall of the cover plate, said cover means being shaped to shift said door upward relative to said cover plate when the door is moved by more than a selected amount from said door release position toward said closed position.

16. The assembly defined in claim 12 wherein
wherein the cover plate and door each have a bottom wall, and
further including
first latch means extending down from said cover plate bottom wall, and
second latch means extending down from said door bottom wall, said first and second latch means being arranged and adapted to interfit when said door is in its closed position.

* * * * *